United States Patent
Prakash

(10) Patent No.: US 6,748,102 B2
(45) Date of Patent: Jun. 8, 2004

(54) DOCUMENT ALTERATION INDICATING SYSTEM AND METHOD

(75) Inventor: Ravi Prakash, Concord, NC (US)

(73) Assignee: International Business Machines Corporation, Armonk, NY (US)

(*) Notice: Subject to any disclaimer, the term of this patent is extended or adjusted under 35 U.S.C. 154(b) by 687 days.

(21) Appl. No.: 09/768,640

(22) Filed: Jan. 24, 2001

(65) Prior Publication Data

US 2002/0097903 A1 Jul. 25, 2002

(51) Int. Cl.⁷ .................................................. G06K 9/00
(52) U.S. Cl. ...................... 382/137; 382/194; 382/221; 358/3.06; 358/3.3; 358/534; 356/71; 705/45
(58) Field of Search .................................. 382/100, 137, 382/135, 192, 194, 176, 195, 218, 221, 272; 358/1.8, 3.03, 3.3, 534, 535, 536; 356/71

(56) References Cited

U.S. PATENT DOCUMENTS

| | | | |
|---|---|---|---|
| 3,889,056 A | * 6/1975 | Mayer et al. .................. 380/54 |
| 4,227,720 A | * 10/1980 | Mowry et al. ................. 283/94 |
| 4,606,069 A | * 8/1986 | Johnsen ...................... 382/243 |
| 4,703,434 A | * 10/1987 | Brunner ........................ 716/21 |
| 5,149,140 A | * 9/1992 | Mowry et al. ................. 283/93 |
| 5,291,241 A | 3/1994 | Hirano et al. |
| 5,321,470 A | 6/1994 | Hasuo et al. |
| 5,559,895 A | * 9/1996 | Lee et al. .................... 382/119 |
| 5,751,854 A | * 5/1998 | Saitoh et al. ................ 382/218 |
| 5,765,089 A | * 6/1998 | Hasuo et al. ................ 399/366 |
| 5,796,869 A | 8/1998 | Tsuji et al. |
| 5,824,447 A | 10/1998 | Tavernier et al. |
| 5,825,892 A | 10/1998 | Braudaway et al. |
| 5,890,808 A | * 4/1999 | Neff et al. ................... 382/209 |
| 5,982,930 A | * 11/1999 | Neff et al. ................... 382/209 |
| 6,434,271 B1 | * 8/2002 | Christian et al. ........... 382/194 |
| 6,628,808 B1 | * 9/2003 | Bach et al. .................. 382/115 |

OTHER PUBLICATIONS

IBM Technical Disclosure Bulletin, "Image System Quality and Data Compression Enhancement by Excision of Isolated Single Pels and Quad Pel Groups," Feb. 1989, pp. 235–238.
IBM Technical Disclosure Bulletin, "Automated VOID Pantograph Detection," vol. 38, No. 8, Aug. 1995, pp. 457–458.

* cited by examiner

Primary Examiner—Samir Ahmed
Assistant Examiner—Anand Bhatnagar
(74) Attorney, Agent, or Firm—Hoffman, Warnick & D'Alessandro LLC; Spencer K. Warnick

(57) ABSTRACT

A system and method for detecting alteration of a document. The invention evaluates markings in half-tone fields by ascertaining a first dot count of dots isolated from the marking in the half-tone field of the document; forming an image of the marking; superimposing the image on a blank half-tone field having the same predetermined pattern as the half-tone field of the document; ascertaining a second dot count of dots isolated from the image superimposed on the blank half-tone field; and determining whether the marking has been altered by comparing the first dot count to the second dot count. An alteration is indicated where the first dot count and second clot count are different.

18 Claims, 6 Drawing Sheets

DOCUMENT ALTERATION INDICATING SYSTEM AND METHOD

BACKGROUND OF THE INVENTION

1. Technical Field

The present invention relates generally to prevention of document fraud, more particularly, the invention relates to a document alteration indicating system and method.

2. Related Art

With the advent of advanced document creating, copying and revision technology, the problems relating to fraudulent documents have dramatically increased. To address fraudulent creation and copying, technology has been created that evaluates documents, such as checks, for counterfeiting based on security techniques built into the documents. For example, a pantograph configured in a background of a check can prevent fraudulent copying. Tampering or revising of an established document, however, is not adequately addressed by current counterfeiting prevention processes. One example of tampering is where a defrauder changes the payee name on a check or the amount payable on a check. Evaluation of this type fraud is usually conducted manually. Where a defrauder has made an obvious alteration of a document, e.g., crossing out and replacing a payment amount in a check, tampering is easily determined. However, the advancement in document alteration technology oftentimes makes revisions of documents nearly impossible to catch. This is especially the case where the alteration is of the type that it is not quickly discernable to the naked eye; for example, where typographical error correction liquid is used to remove information from a document.

In institutional entities, such as banks, document processing is oftentimes automated so multitudes of documents can be quickly evaluated. The above-mentioned method of manually evaluating documents for tampering, therefore, is detrimental to efficient document processing.

In view of the foregoing, there is a need in the art for a system and method for accurately and automatically detecting alterations in documents.

SUMMARY OF THE INVENTION

In a first aspect of the invention is provided a method of detecting alteration of a marking in a half-tone field of a document, the half-tone field having a predetermined pattern, the method comprising the steps of: ascertaining a first dot count of dots isolated from the marking in the half-tone field of the document; forming an image of the marking; superimposing the image on a blank half-tone field having the same predetermined pattern as the half-tone field of the document; ascertaining a second dot count of dots isolated from the image superimposed on the blank half-tone field; and determining whether the marking has been altered by comparing the first dot count to the second dot count.

In a second aspect of the invention is provided a system for indicating alteration of a marking of a document half-tone field, the document half-tone field having a predetermined pattern, the system comprising: a dot counter for counting isolated dots of a half-tone field; an imager for forming an image of the marking of the document half-tone field; a superimposer for superimposing the image on a blank half-tone field having the same predetermined pattern as the document half-tone field; a comparator for comparing a first dot count of the document half-tone field to a second dot count of the blank half-tone field with the image superimposed thereon, wherein an alteration is indicated when the first dot count is different than the second dot count. This aspect may also include a document processing system and workstation comprising the above system for indicating alteration of a marking of a document half-tone field.

In a third aspect of the invention is provided a computer program product comprising a computer useable medium having computer readable program code embodied therein for indicating an alteration of a marking on a document half-tone field, the document half-tone field having a predetermined pattern, the computer program product comprising: program code configured to count isolated dots of a half-tone field; program code configured to form an image of the marking of the document half-tone field; program code configured to superimpose the image on a blank half-tone field having the same predetermined pattern as the document half-tone field; and program code configured to compare a first dot count of the document half-tone field to a second dot count of the blank half-tone field with the image superimposed thereon, wherein an alteration is indicated when the first dot count is different than the second dot count.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DETAILED DESCRIPTION OF THE PREFERRED EMBODIMENTS

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., which are disclosed simply to describe the preferred embodiment.

Figure 1:
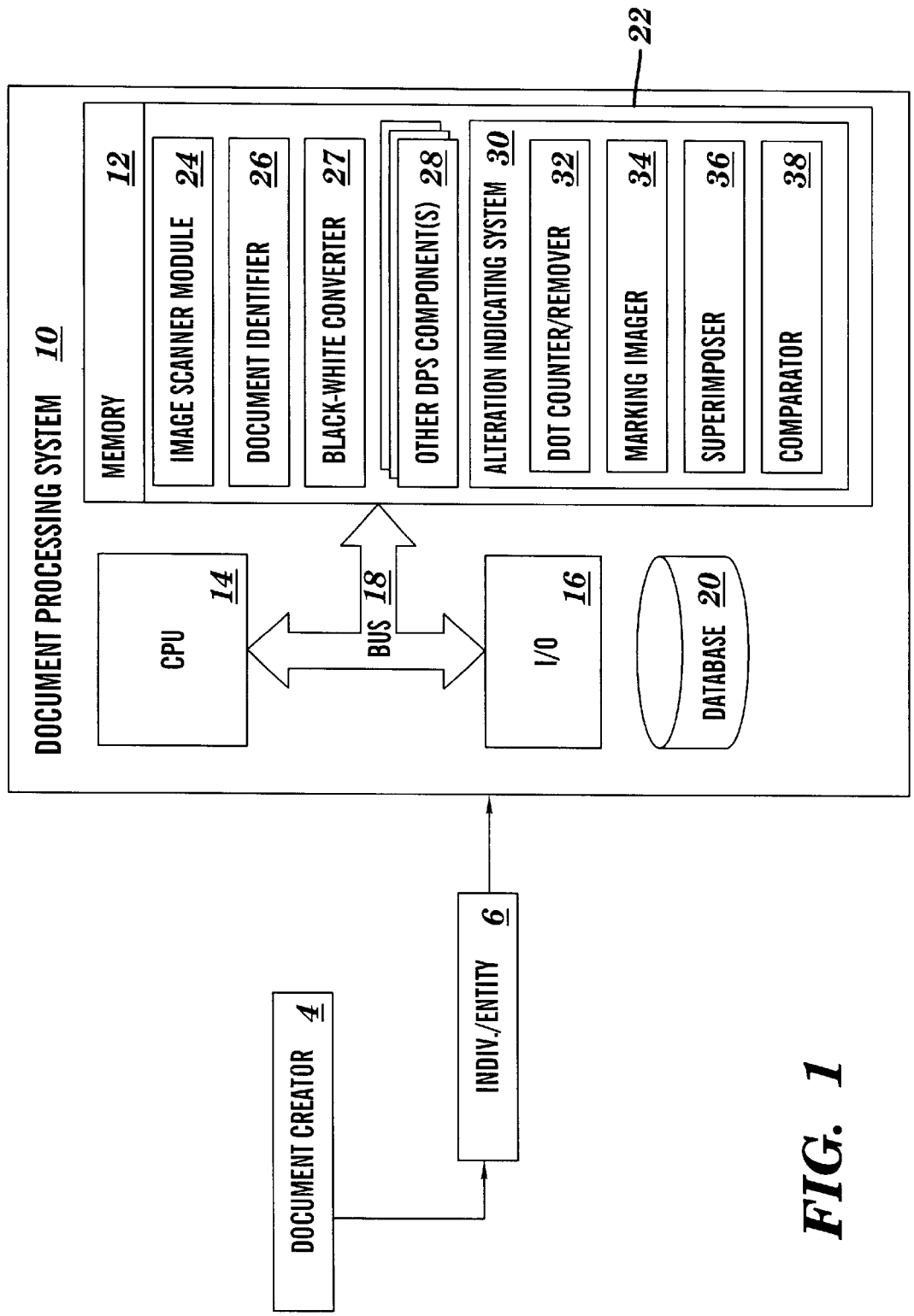
FIG. 1 shows a block diagram of a document processing system including a document alteration indicating system in accordance with the invention.

FIG. 1 is a block diagram of a document processing system 10 including an alteration indicating system 28 in accordance with a preferred embodiment of the present invention. A document is generally created by a document creator 4 for an individual or entity 6. Individual or entity 6 then has the document processed by an individual or entity that owns document processing system 10. For purposes of the present invention, an exemplary document that may be processed is a check. It should be recognized, however, that the present invention finds applicability relative to any document that may be altered. In terms of the check example, document creator 4 may be a payment department of a corporation and the individual/entity 6 may be a corporation vendor, e.g., Builder's Square™.

System 10 preferably includes a memory 12, a central processing unit (CPU) 14, input/output devices (I/O) 16 and a bus 18. A database 20 may also be provided for storage of data relative to processing tasks. Memory 12 preferably includes a program product 22 that, when executed by CPU 14, comprises various functional capabilities described in further detail below. Memory 12 (and database 20) may comprise any known type of data storage system and/or transmission media, including magnetic media, optical media, random access memory (RAM), read only memory (ROM), a data object, etc. Moreover, memory 12 (and database 20) may reside at a single physical location comprising one or more types of data storage, or be distributed across a plurality of physical systems. CPU 14 may likewise comprise a single processing unit, or a plurality of processing units distributed across one or more locations. I/O 16 may comprise any known type of input/output device including a network system, modem, keyboard, mouse, scanner, voice recognition system, CRT, printer, disc drives, etc. Additional components, such as cache memory, communication systems, system software, etc., may also be incorporated into system 10.

Document processing system 10 may be implemented in a variety of forms. For example, document processing system 10 may be a high speed, high volume document processing system such as found in institutional banks. For example, system 10 may be implemented as an IBM 3897 Model 1 or 4 Image Capture System. In this case, system 10, as recognized in the field, may include one or more networked computers, i.e., servers. In this setting, distributed servers may each contain only one application/system/module with the remainder of the applications/systems/modules resident on a centrally located server. In another embodiment, a number of servers may be present in a central location, each having different software applications resident therein. A server computer typically comprises an advanced midrange multiprocessor-based server, such as the RS6000 from IBM, utilizing standard operating system software, which is designed to drive the operation of the particular hardware and which is compatible with other system components, and I/O controllers.

Alternatively, system 10 may be implemented as a workstation such as a bank teller workstation. A workstation of this form may comprise, for example, an INTEL PENTIUM III microprocessor, or like processor, such as found in an IBM Aptiva computer.

Memory 12 of system 10 preferably includes a program product 22 that, when executed by CPU 14, provides various functional capabilities for system 10. As shown in FIG. 1, program product 20 may include an image scanner module 24, a document identifier 26, a black-white converter 27 for converting images to black and white, and other document processing system (DPS) component(s) 28. Other DPS components 28 may include any well known document processing system components, e.g., an image capture processor. In accordance with a preferred embodiment of the invention, program product 22 also may provide, or include, an alteration indicating system 30. Alteration indicating system 30 includes a dot counter/remover 32, a marking imager 34, a superimposer 36 and a comparator 38.

In the following discussion, it will be understood that the method steps discussed preferably are performed by a processor, such as CPU 14 of system 10, executing instructions of program product 22 stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

Figure 2:
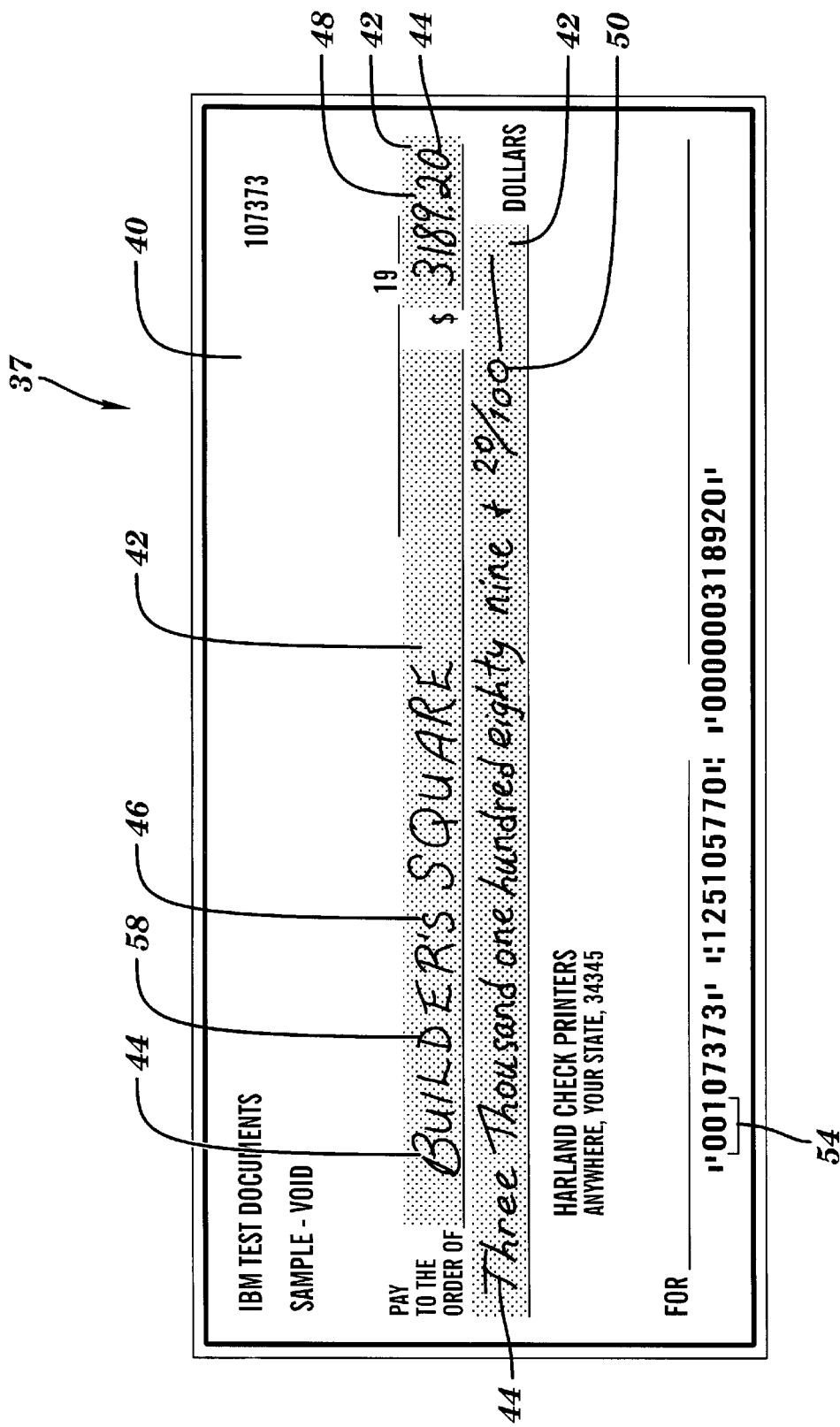
FIG. 2 shows an exemplary document in the form of a check.

Turning to FIG. 2, a document 37 in an exemplary form of a check 40 is shown. Docment 37 includes a number of half-tone fields 42 upon which a marking 44 may be made. As shown in an exemplary half-tone field in FIGS. 3 and 4, each half-tone field 42 has a predetermined pattern of small dots that are arranged in such a way that when docment 37 is imaged the dots appear separate. In a preferred embodiment, a predetermined pattern is recognized by the number of dots in the half-tone field 42. However, other measurement mechanisms for a half-tone field 42 may be possible. Each half-tone field 42 may have any geometric pattern. In a preferred embodiment, a black-white image of each dot is typically less than or equal to a 2×2 pixel matrix with at least one of the four pixels set to black. For reasons that will become apparent below, a high density dot pattern, e.g. 7,000–15,000 dots per square inch, is preferred because it provides higher detection reliability.

It should be recognized that while the present invention will be described relative to a document 37 having pre-set half-tone fields 42, the invention is equally applicable to a document having a complete half-tone background. In this situation, other methods for determining a specific field of interest are used. For instance, image processing may be used that is capable of evaluating a predetermined dimensional area of the complete half-tone background document, e.g., a space ¼ inch by 3 inches and ½ inch from the top left corner of document 37. Furthermore, each half-tone field 42 need not have a uniform dot density, as illustrated.

In exemplary check 40, half-tone fields 42 include a payee name field 46 (FIGS. 2–4), a curtsey amount field 48 and a legal amount field 50. Each half-tone field 42 may include a marking 44, e.g., the "Builder's Square" marking 58 in payee name field 46 shown in FIGS. 2 and 4. As used herein, a "marking" may be any textual or numerical matter. In the case of check 40, markings 44 are commonly in the form of the payee name and payment amounts. Markings 44 may be placed on the document in any known manner such as printing or handwriting.

Referring to FIGS. 5–9, the logic of detecting alteration of a marking 44 in a half-tone field 42 of a document 37 using alteration indicating system 30 will be described in more detail. Precursor steps to the logic of FIG. 5 may preferably include: 1) imaging document 37, i.e., converting the document into a digital form when document 37 is not already provided in that form; and/or 2) converting the image to black-and-white when document 37 is not already provided in that form; and identification of document 37.

Figure 3:
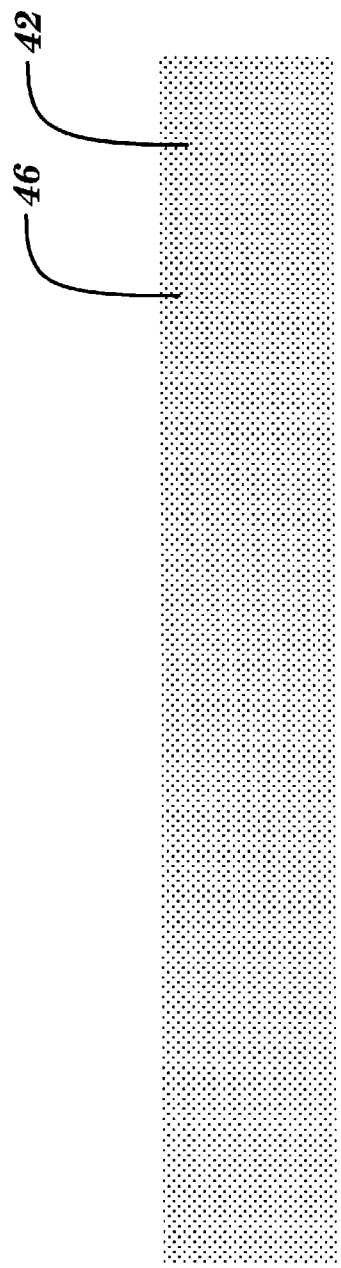
FIG. 3 shows a blank half-tone field of a document.
Figure 4:
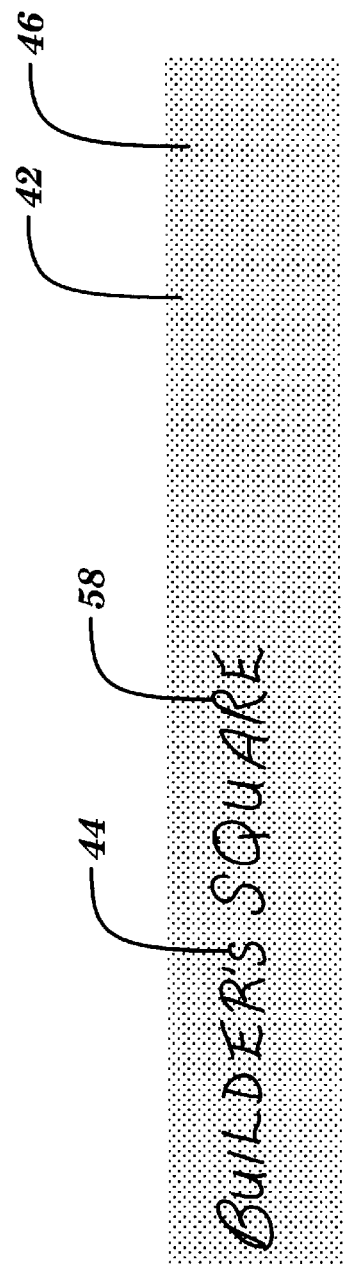
FIG. 4 shows a half-tone field of a document having an intended marking.

Imaging of document 37 may be provided by an image scanner module 24 of system 10 or some other separate imaging system (not shown). Conversion of that image to a black-white image is preferably conducted by a black-white converter 27 of system 10. A document identification is preferably gathered from each document 37 by a document identifier 26. As known in the art, document 37 may include an identification thereon so system 10 may ascertain a variety of information about document 37. For instance, system 10 can evaluate whether document 37 is of a type for which evaluation is desired. In addition, if evaluation is desired, system 10 can determine, inter alia, half-tone field(s) 42 on document 37 and their respective predetermined pattern(s). For example, for check 40, the identification may indicate three half-tone fields 42 of interest: a payee half-tone field 46 having 3,400 dots when blank (FIG. 3 shows a blank payee half-tone field 46), a curtsey amount half-tone field 48 having 300 dots when blank, and a legal amount half-tone field 50 having 4,800 dots when blank. Document information such as half-tone fields present on document 37, etc., may be obtained by system 10 from database 20, which may be subject to periodic updates. In one preferred embodiment, document creator 4 periodically verifies predetermined patterns of half-tone fields 42 of documents 38 used by document creator 4 for use by system 10. Alternatively, if a system 10 is used with a single type of document 37, document identification may be eliminated. In the case of check 40, an identification may be provided, for example, by some digits 54 (FIG. 2) in the checking account identification number.

Figure 5:
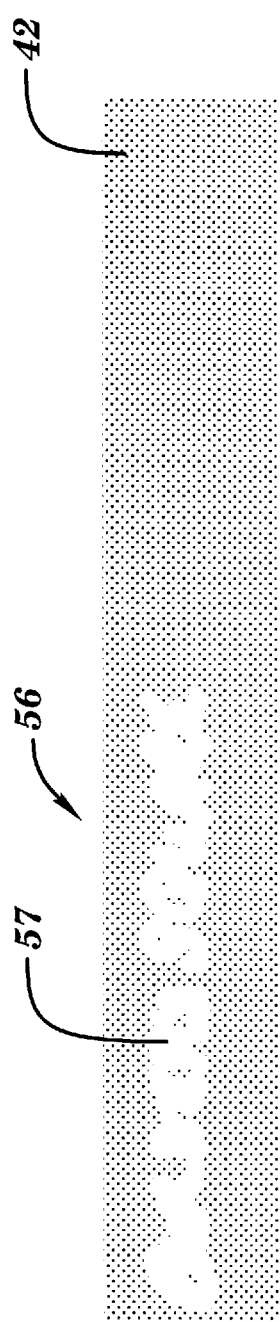
FIG. 5 shows a half-tone field of a document including a tampered section of an alteration.
Figure 6:
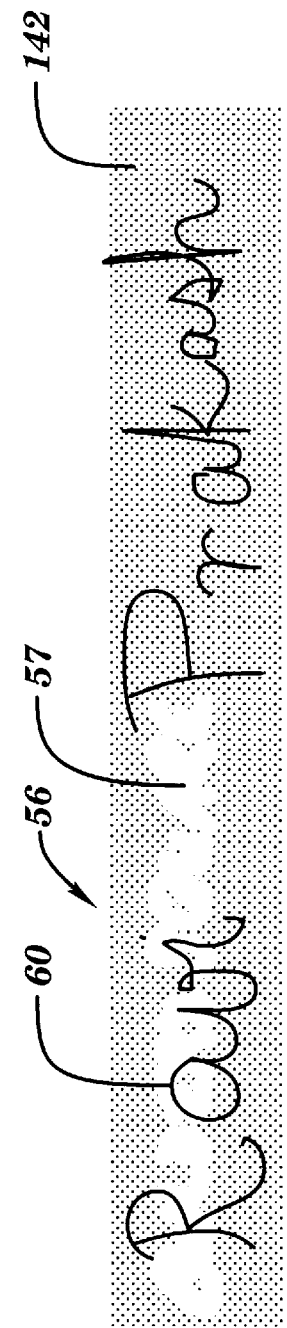
FIG. 6 shows a half-tone field of a document including an alteration having a fraudulent marking.

Referring to FIGS. 5–9, the logic of alteration indicating system 28 will be described in more detail. Alteration indicating system 28 is capable of discovering alterations 56 (FIGS. 5 and 6) that remove dots by non-darkening techniques from an original half-tone field 42. In many cases, alteration 56 includes removal of at least part of an intended marking 58, e.g., payee name "Builder's Square" in FIG. 4. Referring to FIG. 6, a defrauder oftentimes completes alteration 56 by inserting a fraudulent marking 60, e.g., new payee name "Ravi Prakash." However, in some circumstances, alteration 56 may be complete without inclusion of a fraudulent marking 60, i.e., only creation of tampered section 57 is necessary to defraud. Of course, the particular alteration 56 may vary according to half-tone field 42 in issue. For example, a check amount may be altered by replacing an intended amount with a fraudulent amount.

FIG. 5 shows a tampered section 57 where intended marking 58, e.g., the intended payee name "Builder's Square," has been removed along with connected or adjacent dots from half-tone field 42. Removal of intended marking 58 may be conducted by a defrauder in a variety of ways. For instance, intended marking 58 may be removed using typographic error correction liquid such as Liquid Paper® available from The Gillette Company. Of course, other more sophisticated marking removing/altering techniques, e.g., electronic-based techniques, are also possible and considered within the scope of this invention.

Figure 7:
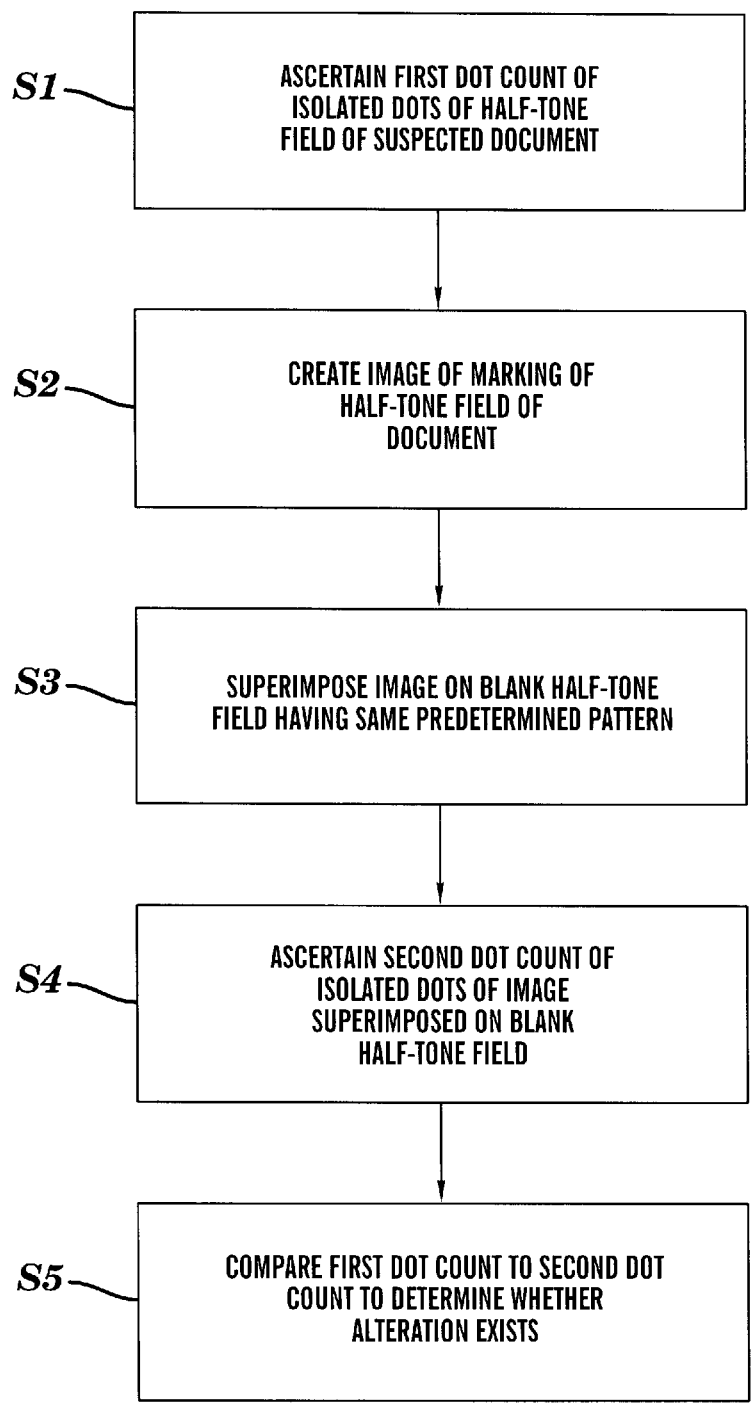
FIG. 7 shows a flow diagram of a method in accordance with the invention.

Turning to FIG. 7, in a first step S1 of the logic of alteration indicating system 30, a first dot count of dots isolated from a marking in a half-tone field of a suspected document is ascertained by dot counter/remover 32. Dot counter/remover 32 is preferably provided in the form of an isopixel removal system such as disclosed in IBM Technical Disclosure Bulletin, February 1989, pages 235–238, entitled "Image System Quality and Data Compression Enhancement by Excision of Isolated Single Pels and Quad Pel Groups." Referring to FIG. 6, a suspect half-tone field 142 including an alteration 56 having a tampered section 57 and fraudulent marking "Ravi Prakash" 60 is shown. When dot counter/remover 32 is applied to the black-white image of half-tone field 142, black isolated or discontiguous pixel(s) that are less than a 2×2 pixel matrix are converted to white, thus removing isolated dots from the image. Since half-tone field 42 includes dots that are inherently less than 2×2, the half-tone field 42 is removed. Markings 44, however, do not include less than 2×2 pixels and are therefore not removed. As dot counter/remover 32 removes dots, it also provides a count of the dots that have been converted from black to white. For example, a first dot count of suspect half-tone field 142 may be 2,663.

Figure 8:
FIG. 8 shows an image of a marking.

In step S2, an image 62, shown in FIG. 8, of the marking in suspect half-tone field 142 is created by marking imager 34. Marking imager 34 images contiguous dark or black sections of the marking in suspect half-tone field 142. Accordingly, tampered section 57 is not included in image 62.

Figure 9:
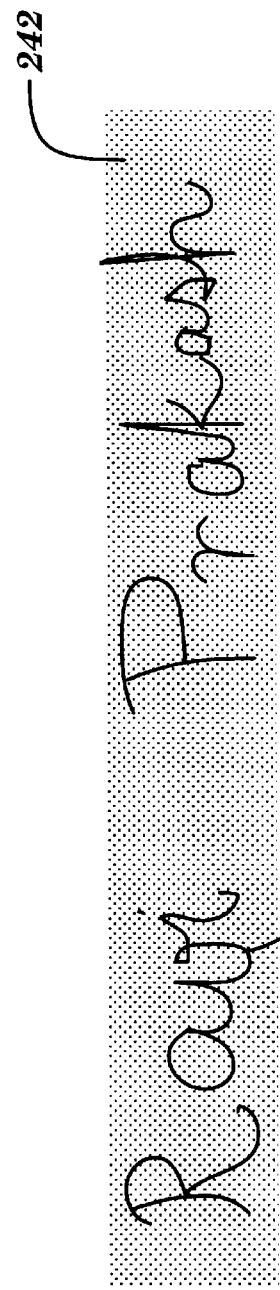
FIG. 9 shows the image of FIG. 8 superimposed on a blank half-tone field.

In step S3, as shown in FIG. 9, image 62 of marking 58 is superimposed on a blank half-tone field 242 having the same predetermined pattern as suspect half-tone field 142 by a superimposer 34. This step may also include converting the blank half-tone field 242 with image 62 to black-and-white using black-white converter 27, if necessary. The resulting theoretical image represents how the marking and respective half-tone field should appear when no alteration 56 is present.

In step S4, a second dot count of dots isolated from image 62 superimposed on blank half-tone field 242 is ascertained by dot counter/remover 32. This second dot count includes dots that would be expected when no alteration 56 is present. This is because the superimposed image 62 represents how the marking and respective half-tone field should appear in that situation.

In step S5, a determination as to whether intended marking 58 has been altered is provided by comparator 38 by comparing the first dot count to the second dot count. Where no alteration 56 is present, first dot count and second dot count will be substantially the same because the dot counts are conducted on practically identical marking and half-tone field combinations. In contrast, an alteration 56 is indicated where the first dot count is different than the second dot count. This would be the case where an alteration 56 is present because the first dot count would not include dots of tampered section 57, while the second dot count would include those dots. Hence, the second dot count would be higher if an alteration 56 exists. For instance, in the example above, the first dot count may be 2,663, which does not include the dots, inter alia, removed by tampered section 57. The second dot count may be 2,900. Hence, tampered section 57 eliminated 237 dots (i.e., 2,900–2,663).

In a preferred embodiment, an alteration may be indicated when the first dot count is different than the second dot count by a preset variant. The preset variant may be embodied in any form, e.g., a number of dots, a percentage of the number of dots of a blank half-tone field, etc.

While a method in accordance with the invention has been described with particular functions performed by specified structure in a set sequence, it should be recognized that steps of the process and structure performing the steps may be altered without departing from the scope of the invention. For example, imaging of document 37 and ascertaining a first dot count may be performed by a system other than document processing system 10. In this case, the first dot count may then be communicated to system 10 for back end processing by alteration indicating system 28.

When a document 37 is determined to include an alteration 56, document processing system 10 may flag document 37 for human evaluation or may communicate with document creator 4 to confirm whether document 37 has been altered. In the latter case, it is common practice for document creator 4 to retain an image of each document 37 for recording purposes. Accordingly, referral to images of the original document 37 by document creator 4 may easily confirm or refute alteration of document 37.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method of detecting alteration of a marking in a half-tone field of a document, the half-tone field having a predetermined pattern, the method comprising the steps of:
    ascertaining a first dot count of dots isolated from the marking in the half-tone field of the document;
    forming an image of the marking;
    superimposing the image on a blank half-tone field having the same predetermined pattern as the half-tone field of the document;
    ascertaining a second dot count of dots isolated from the image superimposed on the blank half-tone field; and
    determining whether the marking has been altered by comparing the first dot count to the second dot count, wherein an alteration of the marking is indicated when the first dot count is different than the second dot count.

2. The method of claim 1, wherein the steps of ascertaining dot counts include conducting an isolated dot removal of the respective half-tone field.

3. The method of claim 1, wherein the step of forming an image of the marking includes converting the half-tone field to a black and white image.

4. The method of claim 1, wherein the step of superimposing the image on a blank half-tone field includes converting the blank half-tone field to black and white.

5. The method of claim 1, further comprising the step of determining the predetermined pattern of the half-tone field by obtaining an identifier from the document.

6. The method of claim 5, further comprising the step of verifying the predetermined pattern by digitizing a blank document, converting the digitized blank document to black and white and ascertaining a count of dots thereon.

7. The method of claim 1, wherein an alteration of the marking is indicated when the first dot count is different than the second dot count by a preset variant.

8. The method of claim 1, wherein the half-tone field includes at least one of a payee name field, a curtsey amount field and a legal amount field.

9. A system for indicating alteration of a marking of a document half-tone field, the document half-tone field having a predetermined pattern, the system comprising:
    a dot counter for counting isolated dots of a half-tone field;
    an imager for forming an image of the marking of the document half-tone field;
    a superimposer for superimposing the image on a blank half-tone field having the same predetermined pattern as the document half-tone field;
    a comparator for comparing a first dot count of the document half-tone field to a second dot count of the blank half-tone field with the image superimposed thereon,
    wherein an alteration is indicated when the first dot count is different than the second dot count.

10. The system of claim 9, further comprising a black-white converter for converting a half-tone field to black and white.

11. The system of claim 10, wherein the dot counter includes an isopixel removal system for removing dots from a half-tone field and counting the removed dots.

12. The system of claim 9, wherein the document half-tone field includes at least one of a payee name field, a curtsey amount field and a legal amount field.

13. A document processing system comprising the system for indicating alteration of a marking of a document half-tone field of claim 9.

14. A workstation comprising the system for indicating alteration of a marking of a document half-tone field of claim 9.

15. A computer program product comprising a computer useable medium having computer readable program code embodied therein for indicating an alteration of a marking on a document half-tone field, the document half-tone field having a predetermined pattern, the computer program product comprising:
    program code configured to count isolated dots of a half-tone field;
    program code configured to form an image of the marking of the document half-tone field;
    program code configured to superimpose the image on a blank half-tone field having the same predetermined pattern as the document half-tone field; and
    program code configured to compare a first dot count of the document half-tone field to a second (lot count of the blank half-tone field with the image superimposed thereon,
    wherein an alteration is indicated when the first dot count is different than the second dot count.

16. The program product of claim 14, further comprising program code configured to convert a half-tone field and marking to black and white.

17. The program product of claim 14, wherein the program code configured to count dots includes an isopixel removal system for removing dots from a half-tone field and counting the removed dots.

18. The program product of claim 14, wherein the document half-tone field includes at least one of a payee name field, a curtsey amount field and a legal amount field.

* * * * *